(12) United States Patent
Gazzino et al.

(10) Patent No.: US 12,258,149 B2
(45) Date of Patent: Mar. 25, 2025

(54) METHOD FOR TESTING A HYBRID DRIVE SYSTEM ON AN AIRCRAFT, ASSOCIATED COMPUTER PROGRAM AND AIRCRAFT

(71) Applicant: AIRBUS HELICOPTERS, Marignane (FR)

(72) Inventors: Marc Gazzino, Marseilles (FR); Guillaume Dumur, Salon de Provence (FR); Jean-François Logeais, Marseilles (FR); Léonard Boudier, Saint-Chamas (FR); Michel Jamot, Aix en Provence (FR); Mikaël Henaff, Aix en Provence (FR); Jérémy Camus, Ensues la Redonne (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 18/396,562

(22) Filed: Dec. 26, 2023

(65) Prior Publication Data
US 2024/0343415 A1  Oct. 17, 2024

(30) Foreign Application Priority Data
Feb. 8, 2023 (FR) .................................. 2301157

(51) Int. Cl.
*B64D 27/33* (2024.01)
*B64F 5/60* (2017.01)
*G01M 15/00* (2006.01)

(52) U.S. Cl.
CPC ................ *B64F 5/60* (2017.01); *B64D 27/33* (2024.01); *F05D 2260/80* (2013.01); *G01M 15/00* (2013.01)

(58) Field of Classification Search
USPC ....................................................... 73/114.59
See application file for complete search history.

(56) References Cited

U.S. PATENT DOCUMENTS 3,592,053 A * 7/1971 Lucia ................... G01M 15/044
                                                                 73/66
4,887,087 A * 12/1989 Clearwater ............ G01B 11/16
                                                                342/61

(Continued)

FOREIGN PATENT DOCUMENTS

| EP | 3865677 A1 | 8/2021 |
| WO | 2018171495 A1 | 9/2018 |
| WO | 2020156079 A1 | 8/2020 |

OTHER PUBLICATIONS

French Search Report for French Application No. FR2301157, Completed by the French Patent Office, Dated Apr. 16, 2023, 9 pages.

*Primary Examiner* — Craig Kim
*Assistant Examiner* — Marc Amar
(74) *Attorney, Agent, or Firm* — BROOKS KUSHMAN P.C.

(57) ABSTRACT

A method for testing a hybrid power plant equipping a rotary-wing aircraft comprising at least one lift rotor, the hybrid power plant being configured to rotate the at least one lift rotor, the hybrid power plant comprising at least one heat engine configured to rotate the at least one lift rotor; and at least one electric motor supplied with electrical energy by at least one electrical power source, the at least one electric motor being configured to rotate the at least one lift rotor at least when at least one of the at least one heat engine fails.

14 Claims, 2 Drawing Sheets

(56) References Cited

U.S. PATENT DOCUMENTS

| | | | | |
|---|---|---|---|---|
| 5,383,133 | A * | 1/1995 | Staple | G01H 1/00 340/963 |
| 7,031,812 | B1 * | 4/2006 | Pettigrew | B64C 27/06 701/14 |
| 2011/0048119 | A1 * | 3/2011 | Hansen | G01M 15/14 73/118.01 |
| 2013/0204468 | A1 * | 8/2013 | Camhi | G07C 5/0816 701/100 |
| 2013/0332022 | A1 * | 12/2013 | Green | B64C 27/008 701/29.1 |
| 2014/0117148 | A1 * | 5/2014 | Dyrla | B64C 27/14 244/17.13 |
| 2014/0263820 | A1 * | 9/2014 | Smith | B64D 27/24 244/17.19 |
| 2015/0120247 | A1 * | 4/2015 | Albsmeier | G01R 31/343 702/183 |
| 2015/0176488 | A1 | 6/2015 | Borchers et al. | |
| 2015/0177104 | A1 * | 6/2015 | Buquet | G01R 21/00 73/112.01 |
| 2017/0225573 | A1 * | 8/2017 | Waltner | B60L 50/50 |
| 2018/0357840 | A1 * | 12/2018 | Gansler | G07C 5/0808 |
| 2018/0370651 | A1 * | 12/2018 | Miller | B64D 27/33 |
| 2020/0331621 | A1 | 10/2020 | Gomez | |
| 2023/0227171 | A1 * | 7/2023 | Baig | B64D 27/16 244/53 R |
| 2024/0425188 | A1 * | 12/2024 | Mark | F02K 5/00 |

\* cited by examiner

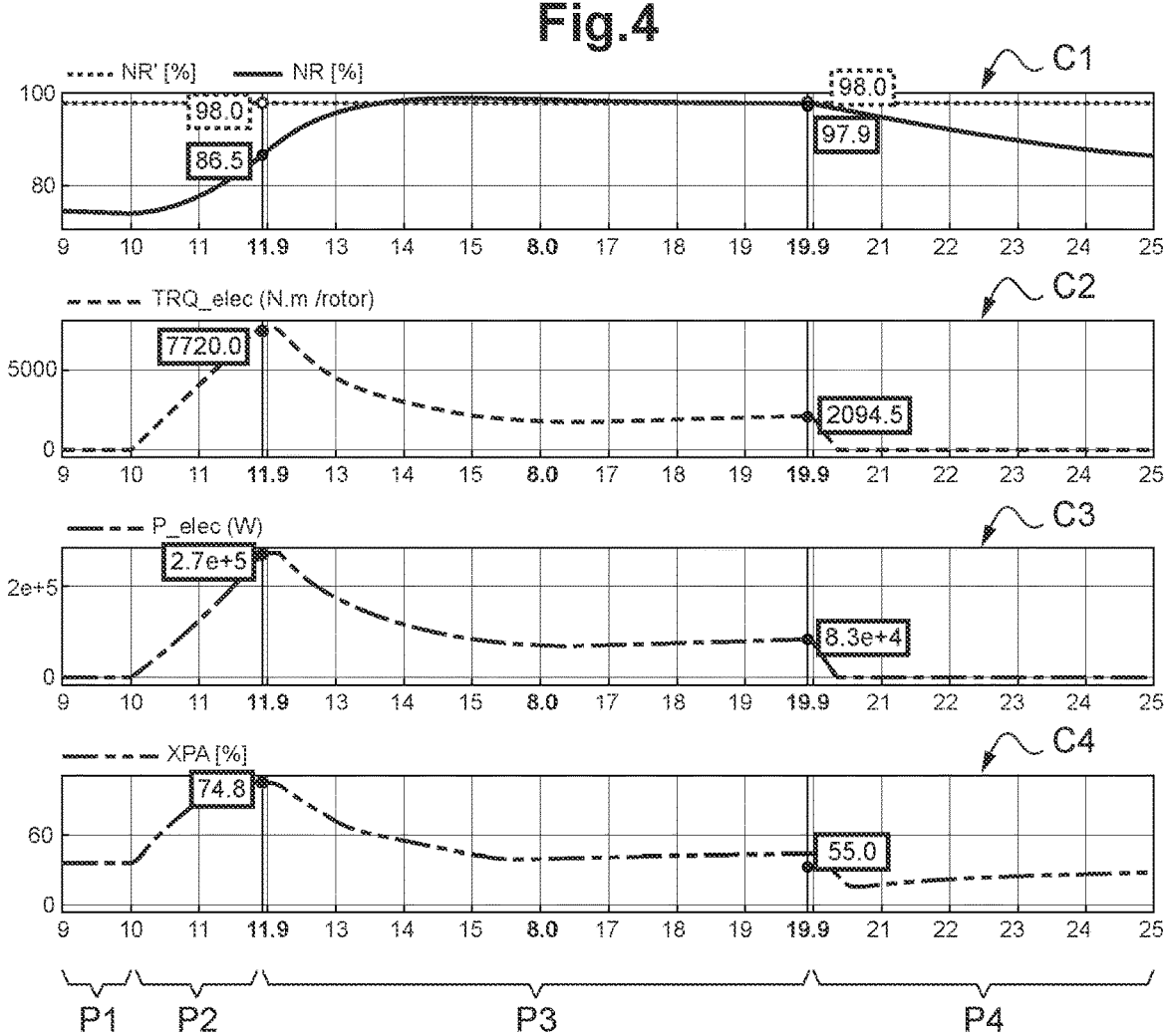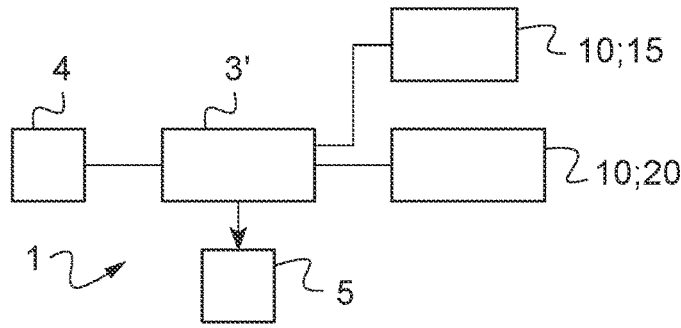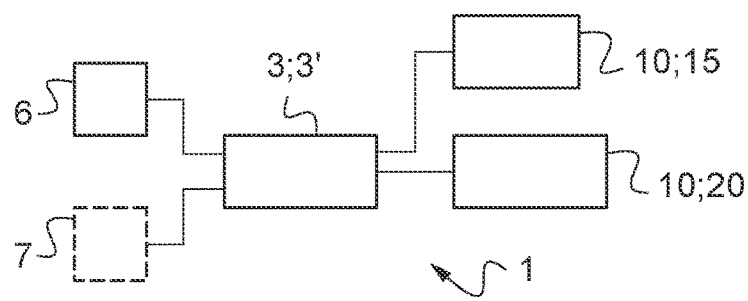

METHOD FOR TESTING A HYBRID DRIVE SYSTEM ON AN AIRCRAFT, ASSOCIATED COMPUTER PROGRAM AND AIRCRAFT

CROSS-REFERENCE TO RELATED APPLICATIONS

This application claims priority to French Patent Application No. FR 23 01157 filed on Feb. 8, 2023, the disclosure of which is incorporated in its entirety by reference herein.

TECHNICAL FIELD

The present disclosure relates to a method for testing a hybrid power plant equipping a rotary-wing aircraft. Such a hybrid power plant is provided with at least one heat engine and at least one electric motor.

In particular, a rotorcraft may be provided with such a hybrid power plant for rotating at least one lift rotor, possibly via at least one gearbox.

BACKGROUND

An electric motor may be in the form of an electric machine that is only able to operate in a motor mode wherein this electric machine provides a mechanical power, or an electric machine that is able to operate in such an electric motor mode and alternatively in an electric generator mode wherein this electric machine generates and supplies electrical energy. Such an electric motor is conventionally electrically connected to an electrical energy source. The electrical energy source may comprise a plurality of electrical accumulators arranged in one or more electric batteries. An electrical accumulator is also sometimes referred to as a cell.

A heat engine is an internal combustion engine provided with a combustion chamber supplied with fuel and an oxidizer, such as a turboshaft engine or a piston engine, for example.

For example, a rotorcraft may comprise a heat engine and an electric motor that are each able to set a lift rotor in motion. The purpose of the electric motor may in particular be to supply mechanical power to the lift rotor in the event of failure of the heat engine. Such a rotorcraft thus combines the advantages of a single-engine rotorcraft while also offering the level of safety of a twin-engine rotorcraft by virtue of the assistance provided by the electric motor in the event of failure of the heat engine. Indeed, the electric motor can provide mechanical power to the lift rotor, following the failure of the heat engine, for a period of a few minutes. This additional mechanical power may allow the rotorcraft to reach a secure landing area. When flying over a city, such a hybrid power plant may increase people's safety by possibly allowing the rotorcraft to reach a landing area situated outside the city, for example.

Using an electric motor in a power plant of an aircraft is therefore beneficial, in particular in order to optimize the safety of the aircraft in the event of failure of a heat engine. However, this electric motor requires the use of an electricity network electrically connected to the electric motor. This electricity network is in particular dimensioned to supply the electric motor with the electrical power required in order for the electric motor to provide the mechanical power required to carry out the planned mission. The electricity network of a hybrid rotorcraft is, for example, dimensioned so that the electric motor provides a predetermined mechanical power at the very least for a predetermined time period in the event of failure of a heat engine. However, such an electricity network is liable to be inadequate and to not allow the electric motor to fulfil the desired function.

Document WO2020/156079 A1 describes a method and a device for monitoring an electric battery of an aircraft. This method comprises acquiring values of performance parameters of the electric battery, these parameters comprising at least a number of operating cycles, the lowest electrical voltage at the terminals of a cell of the electric battery, and a difference between electrical voltages at the terminals of the cells of the electric battery. The difference between electrical voltages at the terminals of the cells of the electric battery is measured between the electrical voltage of the cell of the electric battery that has the highest electrical voltage at its terminals and the electrical voltage of the cell of the electric battery that has the lowest electrical voltage at its terminals.

The method comprises a step of determining a state identifier as a function of the values of the performance parameters, the aircraft being controlled during flight to follow a strategy that is a function of this state identifier.

Document WO2018/171495 describes a system for managing an electric battery. A management chip calculates information about the health of a cell module of the electric battery as a function of electrical current, voltage and temperature data.

Documents US 2014/117148 A1, US 2020/331621 A1, EP 3865 677 A1 and US 2015/176488 A1 are known and are far removed from the disclosure.

SUMMARY

An object of the present disclosure is thus to propose a method for testing a hybrid power plant intended to ensure the safety of a flight performed by an aircraft equipped with this hybrid power plant. More precisely, the disclosure can be used to test the availability of the mechanical power that can be supplied by an electric motor, in particular to compensate for the failure of a heat engine of the hybrid power plant.

The disclosure therefore relates to a method for testing a hybrid power plant equipping a rotary-wing aircraft comprising at least one lift rotor, the hybrid power plant being configured to rotate said at least one lift rotor, the hybrid power plant comprising:
  at least one heat engine configured to rotate said at least one lift rotor; and
  at least one electric motor supplied with electrical energy by at least one electrical power source, said at least one electric motor being configured to rotate said at least one lift rotor at least when at least one of said at least one heat engine fails.

According to the disclosure, such a method is remarkable in that it comprises a first test performed on the ground comprising the following steps:
  starting said at least one heat engine;
  controlling a supply of fuel to said at least one heat engine, the control of the supply of fuel being configured so that a speed of rotation NR of said at least one lift rotor reaches a first threshold speed V1;
  when the speed of rotation NR of said at least one lift rotor is greater than or equal to the first threshold speed V1, first control of a supply of power to said at least one electric motor, the first control of the supply of power being configured so that the speed of rotation NR of said at least one lift rotor reaches a second threshold speed V2 greater than the first threshold speed V1, the first control of the supply of power being carried out according to a predetermined control profile;

determining a first period of time D1 taken by said at least one lift rotor to shift from the first threshold speed V1 to the second threshold speed V2; and checking that the first time period D1 is less than a predetermined threshold time period Ds.

In other words, such a first test is carried out before the aircraft takes off. The heat engine may be started by a pilot, a crew member or a maintenance operator, for example by actuating a start control. Another control may possibly then be actuated in order to activate an idle mode enabling the heat engine to run at idle speed. In this idle mode, the electric motor is rotated and then operates like an electric machine in generator mode, for example to recharge said at least one electrical power source with electrical energy.

The idle mode is implemented by a supervisor system that can be used to control, for example, the flow rate of a fuel pump, and therefore to supply fuel to the heat engine or engines so that they operate at their idle speed.

At this idle speed of the heat engine or engines, the speed of rotation NR of said at least one lift rotor may thus reach the first non-zero threshold speed V1.

For example, the first threshold speed V1 may be between 70% and 80% of a nominal rotation value NRnom, for example corresponding to a speed of rotation allowing a predetermined nominal flight phase to be conducted. The second threshold speed V2 may be between 95% and 100% of this nominal rotation value NRnom.

From the instant when the first threshold speed V1 is reached, the heat engine can then be maintained with a supply of fuel allowing stabilized operation of the heat engine and the first control of the supply of power to said at least one electric motor is then implemented in such a way as to increase the speed of rotation NR of said at least one lift rotor up to a second threshold speed V2 greater than the first threshold speed V1.

Such a first control of the supply of power is carried out by the supervisor system of the hybrid power plant according to the predetermined control profile, for example according to an affine function of an electrical voltage or a supply current as a function of a time variable and parameters stored in a memory of the supervisor system.

The electric motor or motors are then requested to operate with a nominal power according to the predetermined control profile in order to detect potential malfunctions or a drop in performance of the electric motor or motors.

The first period of time D1 taken by the electric motor or motors to rotate the lift rotor or rotors at the speed V2 is then compared with the predetermined threshold time period Ds. When the first time period D1 is less than the predetermined threshold time period Ds, the test is validated and the aircraft can then begin its mission or undergo an additional test, if necessary.

However, if the first time period D1 is greater than or equal to the predetermined threshold time period Ds, the test has failed and the hybrid power plant can be stopped.

For example, such a predetermined threshold time period Ds may advantageously be between 2 secs (seconds) and 4 secs (seconds).

Furthermore, this predetermined threshold time period Ds must be chosen to be sufficiently long to prevent the occurrence of significant mechanical torque jerks on the dynamic assemblies of the helicopter and also prevent any induced yaw movements.

Such a test method may moreover comprise one or more of the following features, taken individually or in combination.

Furthermore, the first control of the supply of power to said at least one electric motor may comprise at least one regulating loop so that the speed of rotation NR of the lift rotor or rotors reaches the second threshold speed V2.

According to a first embodiment of the disclosure, the first control of the supply of power to said at least one electric motor may comprise a first torque regulation relative to an engine torque supplied by said at least one electric motor.

In other words, according to this first example, the engine torque supplied by said at least one electric motor can be measured and compared with a torque setpoint for the purpose of establishing a torque feedback loop in order to regulate the first control of the supply of power.

Such a torque setpoint then varies from a zero or minimum torque setpoint to a maximum torque setpoint allowing the lift rotor or rotors to be rotated at the speed of rotation NR greater than or equal to the second threshold speed V2.

According to a second embodiment of the disclosure, the first control of the supply of power to said at least one electric motor may comprise a second speed regulation relative to a speed of rotation of a member of a transmission kinematic linkage linking said at least one electric motor to said at least one lift rotor.

According to the second example, the speed of rotation of a member of a transmission kinematic linkage can be measured and compared with a speed setpoint so as to implement a speed feedback loop in order to regulate the first control of the supply of power.

Such a speed setpoint then varies from a zero or minimum speed setpoint to a maximum speed setpoint allowing the lift rotor or rotors to be rotated at the speed of rotation NR greater than or equal to the second threshold speed V2.

According to a third embodiment of the disclosure, the first control of the supply of power to said at least one electric motor may comprise a third power regulation relative to a driving power supplied by said at least one electric motor.

Finally, according to this third example, the driving power supplied by said at least one electric motor may be determined or calculated and then compared with a power setpoint so as to implement a power feedback loop in order to regulate the first control of the supply of power.

Such a power setpoint then varies from a zero or minimum power setpoint to a maximum power setpoint allowing the lift rotor or rotors to be rotated at the speed of rotation NR greater than or equal to the second threshold speed V2.

Moreover, the first control of the supply of power to said at least one electric motor may be implemented in different ways.

According to a first variant of the disclosure, the first control of the supply of power to said at least one electric motor may be implemented automatically by a supervisor system.

Therefore, according to this first variant, the first test may be implemented automatically after the heat engine or engines have been started up, or after each start-up. In this case, this first test may be triggered directly by the supervisor system without the pilot actuating a control member.

According to a second variant of the disclosure, the first control of the supply of power to said at least one electric motor may be implemented depending on a control setpoint transmitted by a control member to a supervisor system, the control member allowing a pitch of blades of said at least one lift rotor to be controlled collectively.

In this case, the modification of the supply of power to said at least one electric motor allowing the speed of rotation NR to be increased from the first threshold speed V1 to the second threshold speed V2 may be controlled by the pilot by means of a pitch control lever controlling a pitch of blades of said at least one lift rotor that varies collectively.

The kinematic linkage controlling the collective pitch of the blades may possibly comprise speed limitations in order to protect components of the aircraft and, in particular, dynamic assemblies of this aircraft such as a main gearbox and said at least one lift rotor.

In practice, the first control of the supply of power to said at least one electric motor may be triggered by a pilot selecting a predetermined mode, the selection being implemented by means of a first human-machine interface.

In other words, the mode selected by the pilot may be a test mode intended to at least initiate the test method and then return to the initial mode that was set before the test mode was selected.

Therefore, if the test mode is selected by the pilot, once the test method has been carried out, the supply of power to said at least one electric motor may be switched off and the speed of rotation NR can reduce automatically from the second threshold speed V2 to the first threshold speed V1. The supervisor system can then implement the idle mode of the heat engine if the test is validated, or alternatively switch off the supply of fuel to the heat engine if the test has failed.

Furthermore, when the first test has failed, the supervisor system may possibly inform the pilot by means of an audio or visual alarm. The pilot may then decide to take off in order to perform the mission with limitations linked to the fact that the first test has not been validated.

Alternatively, the mode selected by the pilot may be a flight mode intended to firstly initiate the test method and then secondly implement the flight mode as such, that is different from the initial mode that was set before the flight mode was selected.

Therefore, when the flight mode is selected by the pilot, once the test method has been carried out, the supply of power to said at least one electric motor can be switched off. However, the speed of rotation NR may be kept greater than or equal to the second threshold speed V2 by a new control of the supply of fuel to said at least one heat engine.

Furthermore, the supervisor system can then implement the flight mode if the test is validated or alternatively switch off the supply of fuel to the heat engine if the test has failed.

Moreover, first for the human-machine interface selecting the predetermined mode may be a control knob, a keyboard, a screen pointing device or a touch-sensitive control interface.

Advantageously, once the first test is validated, the method may comprise at least one other additional test.

Therefore, the method may comprise a second test comprising the following steps:
 when the speed of rotation NR of said at least one lift rotor is greater than or equal to the second threshold speed V2, second control of a supply of power to said at least one electric motor, the second control of the supply of power being configured to keep the speed of rotation NR of said at least one lift rotor greater than or equal to the second threshold speed V2 for a second predetermined time period D2;
 calculating an electrical power Pe supplied by said at least one electrical power source to said at least one electric motor for the second predetermined time period D2; and
 identifying that said electrical power Pe is stable for the second predetermined time period D2, being between a lower predetermined threshold power Psinf and an upper predetermined threshold power Pssup.

Such an electrical power Pe therefore corresponds to the total power supplied to said at least one electric motor by said at least one electrical power source for this second predetermined time period D2. Such an electrical power Pe may in particular be calculated from an electric current supplied to said at least one electric motor by said at least one electrical power source for this second predetermined time period D2.

The electrical power Pe supplied by said at least one electrical power source to keep the lift rotor or rotors at the speed V2 for the second predetermined time period D2 is then compared with the lower predetermined threshold power Psinf and the upper predetermined threshold power Pssup. When the electrical power Pe is substantially constant for the second predetermined time period D2, being greater than the lower predetermined threshold power Psinf and less than the upper predetermined threshold power Pssup, the second test is validated and the aircraft may then possibly begin its mission or undergo an additional test, if required.

However, if the electrical power Pe is not stable and does not remain between the lower predetermined threshold power Psinf and an upper predetermined threshold power Pssup, the second test has failed and the hybrid power plant may be stopped, for example.

Alternatively, when the second test has failed, the supervisor system may possibly inform the pilot by means of an audio or visual alarm.

When this second test is performed on the ground, the pilot may then decide to take off in order to perform the mission with limitations linked to the fact that the second test has not been validated.

When this second test is performed during flight, the pilot may then decide to conclude the current mission with limitations linked to the fact that the second test has not been validated.

For example, such an electrical power Pe supplied by said at least one electrical power source for the second predetermined time period D2 may advantageously be between 50 kw (kilowatt) and 100 KW (kilowatt). According to this example, the lower predetermined threshold power Psinf may then be equal to 49 kW (kilowatt) and the upper predetermined threshold power Pssup may then be equal to 101 kW.

For example, such a second predetermined time period D2 may advantageously be between 0.5 secs (second) and 2 secs (second).

According to a first embodiment of the disclosure, the second test may be triggered by a pilot making a selection by means of a second human-machine interface.

As in the case of the first human-machine interface, the second human-machine interface may be a control knob, a keyboard, a screen pointing device or a touch-sensitive control interface.

Furthermore, the first human-machine interface and the second human-machine interface may be separate from each other or alternatively merged to form a single human-machine interface.

According to a second embodiment of the disclosure, the second test may be performed automatically after the first test.

In this case, the second test may be triggered without the pilot taking any particular action. In this case, no human-machine interface is used to select the second test. Possibly, and if the first test is validated, a predetermined time delay of a few seconds, for example, may be implemented by the supervisor system between the end of the first test and the start of the second test.

In practice, the second test may be performed on the ground.

Therefore, once the first test has been carried out and validated, the second test may be triggered before the aircraft takes off.

Alternatively, the second test may be carried out during a flight phase of the aircraft.

In this case, the second test may be implemented after the aircraft has taken off and therefore while a flight phase of the aircraft is underway during a hybridization phase of the hybrid power plant using said at least one electric motor.

An object of the present disclosure is also a computer program configured to be implemented in a rotary-wing aircraft comprising at least one lift rotor and one hybrid power plant, the hybrid power plant being configured to rotate said at least one lift rotor, the hybrid power plant comprising:
  at least one heat engine configured to rotate said at least one lift rotor; and
  at least one electric motor supplied with electrical energy by at least one electrical power source, said at least one electric motor being configured to rotate said at least one lift rotor at least when at least one of said at least one heat engine fails.

According to the disclosure, the computer program is remarkable in that it comprises a sequence of instructions that can be carried out by a supervisor system connected to the hybrid power plant, the supervisor system implementing the abovementioned method for testing the hybrid power plant.

Such a computer program is then advantageously stored in a storage unit of the supervisor system.

The disclosure also relates to a rotary-wing aircraft comprising at least one lift rotor and one hybrid power plant, the hybrid power plant being configured to rotate said at least one lift rotor, the hybrid power plant comprising:
  at least one heat engine configured to rotate said at least one lift rotor; and
  at least one electric motor supplied with electrical energy by at least one electrical power source, said at least one electric motor being configured to rotate said at least one lift rotor at least when at least one of said at least one heat engine fails.

According to the disclosure, the aircraft is remarkable in that it comprises a supervisor system connected to the hybrid power plant, the supervisor system implementing the abovementioned method for testing the hybrid power plant.

Therefore, such an aircraft carries a supervisor system on board that is suitable for carrying out at least the first test, and possibly also the second test.

BRIEF DESCRIPTION OF THE DRAWINGS

The disclosure and its advantages appear in greater detail in the context of the following description of embodiments given by way of illustration and with reference to the accompanying figures, wherein:

FIG. 4 shows curves representative of controls of the hybrid power plant implemented during a test method according to the disclosure;

FIG. 5 is a diagram showing a first example of an aircraft 1 according to the disclosure; and FIG. 6 is a diagram showing a second example of an aircraft 1 according to the disclosure.

DETAILED DESCRIPTION

Elements that are present in more than one of the figures are given the same references in each of them.

Figure 1:
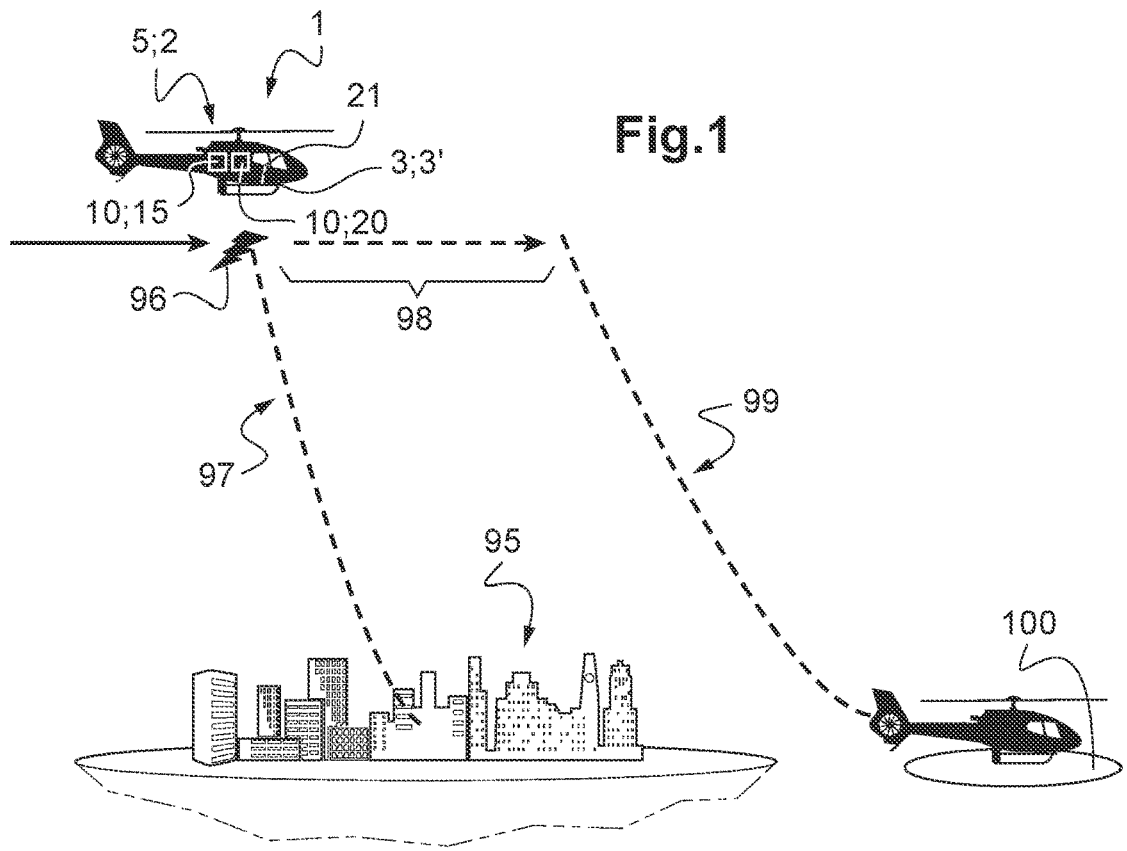
FIG. 1 is a diagram showing a mission of an aircraft according to the disclosure.

FIG. 1 shows an aircraft 1 according to the disclosure. This aircraft 1 is provided with a hybrid power plant 10. The hybrid power plant 10 comprises at least one heat engine 15 and at least one electric motor 20 that are both able to set at least one lift rotor 2 in motion, or indeed only one heat engine 15 and one electric motor 20. The purpose of such an at least one lift rotor 2 may be to contribute to the movement and/or the propulsion of the aircraft 1. This at least one lift rotor 2 therefore comprises at least one blade 5.

For example, the heat engine 15 operates by default, the electric motor 20 having the function of compensating for a failure of the heat engine 15.

On a conventional single-engine aircraft, following a failure 96 of the heat engine, the aircraft descends 97. For example, a helicopter performs autorotation flight. When flying over an urban area 95, the aircraft is likely to move towards this area.

With an aircraft 1 according to the disclosure provided with a hybrid power plant 10, following the failure 96, the electric motor 20 takes over from the heat engine 15 and sets the lift rotor or rotors 2 in motion. For a certain period of time, the aircraft 1 can continue its flight during an electrically powered flight phase 98, and then performs a descent 99. For example, the aircraft 1 performs "autorotation" flight during the descent 99. When flying over an urban area 95, the aircraft is likely to move away from this urban area in order to reach a secured area 100 for landing.

An aircraft 1 according to the disclosure allows a pilot to ensure that the electric motor system is operational prior to take-off, or indeed during a flight phase.

Figure 2:
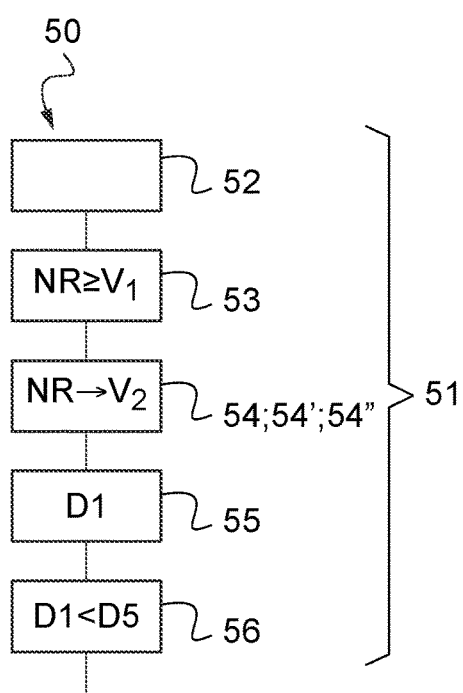
FIG. 2 is a logic diagram showing a first example of a method for testing a hybrid power plant according to the disclosure.

As shown in FIG. 2, a first example of a method 50 for testing the hybrid power plant 10 comprises a first test 51 performed on the ground comprising, firstly, starting 52 the heat engine or engines 15 and controlling a supply of fuel 53 to the heat engine or engines 15 in order to increase a speed of rotation NR of the lift rotor or rotors 2 up to a first threshold speed V1.

Secondly, when the speed of rotation NR of the lift rotor or rotors 2 is greater than or equal to the first threshold speed V1, the first test 51 then comprises first control of a supply of power 54, 54', 54" to the electric motor or motors 20 in order to increase the speed of rotation NR of the lift rotor or rotors 2 up to a second threshold speed V2 greater than the first threshold speed V1.

Furthermore, this first control of the supply of power 54, 54', 54" is carried out, for example, according to a predetermined control profile, as shown in FIG. 4. Such a predetermined control profile is shown during a phase P2 of the curve C2 that is representative of the engine torque supplied by the electric motor or motors 20 as a function of time.

Such a first control of the supply of power 54, 54', 54" to the electric engine or engines 20 is moreover implemented by means of a supervisor system 3, 3' on board the aircraft 1. This first control of the supply of power 54, 54', 54" may, for example, be automatic in the case of the supervisor system 3 or alternatively, as shown in FIG. 5, dependent on a control setpoint transmitted by a control member 4 to supervisor system 3'. Such a control member 4 is configured to collectively control a pitch of the blade or blades 5 of the lift rotor or rotors 2.

The supervisor system 3, 3' may, for example, comprise at least one processor and at least one memory, at least one integrated circuit, at least one programmable system, or at least one logic circuit, these examples not limiting the scope to be given to the term "supervisor system". The term "processor" may refer equally to a central processing unit or CPU, a graphics processing unit or GPU, a digital signal processor or DSP, a microcontroller, etc.

Furthermore, the supervisor system 3, 3' is able to run a computer program according to the disclosure comprising a sequence of instructions implementing the method 50 for testing the hybrid power plant 10.

According to a first embodiment of the disclosure, this first control of the supply of power 54 to the electric motor or motors 20 may comprise a first torque regulation relative to an engine torque supplied by the electric motor or motors 20.

According to a second embodiment of the disclosure, the first control of the supply of power 54' to the electric motor or motors 20 may comprise a second speed regulation relative to a speed of rotation of a member of a transmission kinematic linkage linking the electric motor or motors 20 to the lift rotor or rotors 2.

According to a third embodiment of the disclosure, the first control of the supply of power 54" to the electric motor or motors 20 may comprise a third power regulation relative to a driving power supplied by the electric motor or motors 20.

The first test 51 then comprises determining 55 a first period of time D1 taken by the lift rotor or rotors 2 to shift from the first threshold speed V1 to the second threshold speed V2, then checking 56 that this first time period D1 is less than a predetermined threshold time period Ds.

Figure 3:
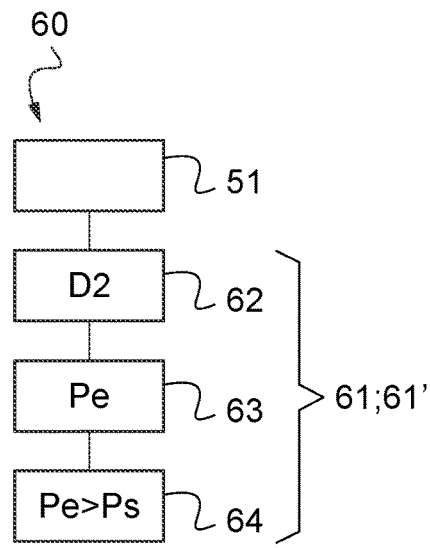
FIG. 3 is a logic diagram showing a second example of a method for testing a hybrid power plant according to the disclosure.

As shown in FIG. 3, a second example of the method 60 for testing the hybrid power plant 10 comprises, in addition to the first test 51 mentioned above, a second test 61, 61'.

This second test 61, 61' then comprises, when the speed of rotation NR of the lift rotor or rotors 2 is greater than or equal to the second threshold speed V2, second control of a supply of power 62 to the electric motor or motors 20. Such a second control of the supply of power 62 is configured to keep the speed of rotation NR of the lift rotor or rotors 2 greater than or equal to the second threshold speed V2 for a second predetermined time period D2.

The second test 61, 61' next comprises calculating 63 an electrical power Pe supplied by the electrical power source or sources 21 to the electric motor or motors 20 for the second predetermined time period D2 and finally identifying 64 that the electrical power Pe is substantially stable and between a lower predetermined threshold power Psinf and an upper predetermined threshold power Pssup.

Furthermore, the supervisor system 3, 3' may also be used to run a computer program comprising a sequence of instructions implementing the method 60 for testing the hybrid power plant 10.

As shown in FIG. 4, the curve C1 is representative of the speed of rotation NR of the lift rotor or rotors 2 as a function of time for successive phases P1, P2, P3 and P4.

The curve C2 is representative of the engine torque supplied by the electric motor or motors 20 to drive the lift rotor or rotors 2 as a function of time during the same successive phases P1, P2, P3 and P4.

The curve C3 is representative of the electrical power supplied by the electric motor or motors 20 to drive the lift rotor or rotors 2 as a function of time during the same successive phases P1, P2, P3 and P4.

Finally, the curve C4 is representative of a control setpoint of a collective pitch of the blades 5 of the lift rotor or rotors 2 as a function of time during the same successive phases P1, P2, P3 and P4.

As shown in FIG. 6, the first control of the supply of power 54, 54', 54" to the electric motor or motors 20 may be triggered by a pilot selecting a predetermined mode. Such a selection may be implemented by means of a first human-machine interface 6 formed, for example, by a knob, a pointing device or a touch-sensitive control interface.

The first human-machine interface 6 is connected to the supervisor system 3, 3' in order to enable the first control of the supply of power 54, 54', 54" to the electric motor or motors 20 to be started as a function of the selected predetermined mode.

Such a predetermined mode may, for example, be a test mode intended, for example, to perform the first test 51 and then to stop the first control of the supply of power 54, 54', 54" to the electric motor or motors 20 or a flight mode making it possible, for example, to carry out the first test 51 and the second test 61, 61' before allowing the aircraft 1 to take off if the two tests are validated.

Similarly, the second test 61 may be triggered by a pilot making a selection by means of a second human-machine interface 7. Such a second human-machine interface 7 may also be formed, for example, by a knob, a pointing device or a touch-sensitive control interface.

Furthermore, this second human-machine interface 7 may be separate from or merged with the first human-machine interface 6.

Alternatively, the second test 61' may be triggered automatically upon validation of the first test 51.

In any case, if one of the tests 51, 61, 61' has not been validated, the supervisor system 3, 3' can either control the hybrid power plant 10 to stop, if the aircraft 1 is on the ground, or issue an alert informing the pilot of a problem, if the aircraft 1 is flying.

In this second case, the pilot may then be forced to abandon the mission, return to base or make an emergency landing.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the claims of the present disclosure.

What is claimed is:

1. A method for testing a hybrid power plant equipping a rotary-wing aircraft comprising at least one lift rotor, the hybrid power plant being configured to rotate the at least one lift rotor, the hybrid power plant comprising:
   at least one heat engine configured to rotate the at least one lift rotor; and
   at least one electric motor supplied with electrical energy by at least one electrical power source, the at least one electric motor being configured to rotate the at least one lift rotor at least when at least one of the heat engine(s) fails, wherein the method comprises a first test performed on the ground comprising the following steps:

starting the at least one heat engine;

controlling a supply of fuel to the at least one heat engine, the control of the supply of fuel being configured so that a speed of rotation NR of the at least one lift rotor reaches a first threshold speed V1;

when the speed of rotation NR of the at least one lift rotor is greater than or equal to the first threshold speed V1, first control of a supply of power to the at least one electric motor, the first control of the supply of power being configured so that the speed of rotation NR of the at least one lift rotor reaches a second threshold speed V2 greater than the first threshold speed V1, the first control of the supply of power being carried out according to a predetermined control profile;

determining a first period of time D1 taken by the at least one lift rotor to shift from the first threshold speed V1 to the second threshold speed V2; and checking that the first time period D1 is less than a predetermined threshold time period Ds.

2. The method according to claim 1,
wherein the first control of the supply of power to the at least one electric motor comprises a first torque regulation relative to an engine torque supplied by the at least one electric motor.

3. The method according to claim 1,
wherein the first control of the supply of power to the at least one electric motor comprises a second speed regulation relative to a speed of rotation of a member of a transmission kinematic linkage linking the at least one electric motor to the at least one lift rotor.

4. The method according to claim 1,
wherein the first control of the supply of power to the at least one electric motor comprises a third power regulation relative to a driving power supplied by the at least one electric motor.

5. The method according to claim 1,
wherein the first control of the supply of power to the at least one electric motor is implemented automatically by a supervisor system.

6. The method according to claim 1,
wherein the first control of the supply of power to the at least one electric motor is implemented depending on a control setpoint transmitted by a control member to a supervisor system, the control member allowing a pitch of blades of the at least one lift rotor to be controlled collectively.

7. The method according to claim 1,
wherein the first control of the supply of power to the at least one electric motor is triggered by a pilot selecting a predetermined mode, the selection being implemented by means of a first human-machine interface.

8. The method according to claim 1,
wherein the method comprises a second test comprising the following steps:

when the speed of rotation NR of the at least one lift rotor is greater than or equal to the second threshold speed V2, second control of a supply of power to the at least one electric motor, the second control of the supply of power being configured to keep the speed of rotation NR of the at least one lift rotor greater than or equal to the second threshold speed V2 for a second predetermined time period D2;

calculating an electrical power Pe supplied by the at least one electrical power source to the at least one electric motor during the second predetermined time period D2; and identifying that the electrical power Pe is stable for the second predetermined time period D2, being between a lower predetermined threshold power Psinf and an upper predetermined threshold power Pssup.

9. The method according to claim 8,
wherein the second test is triggered by a pilot making a selection by means of a second human-machine interface.

10. The method according to claim 8,
wherein the second test is performed automatically after the first test.

11. The method according to claim 8,
wherein the second test is performed on the ground.

12. The method according to claim 8,
wherein the second test is performed during a flight phase of the aircraft.

13. A computer program configured to be implemented in a rotary-wing aircraft comprising at least one lift rotor and one hybrid power plant, the hybrid power plant being configured to rotate the at least one lift rotor, the hybrid power plant comprising:

at least one heat engine configured to rotate the at least one lift rotor; and at least one electric motor supplied with electrical energy by at least one electrical power source, the at least one electric motor being configured to rotate the at least one lift rotor at least when at least one of the heat engine(s) fails, wherein the computer program comprises a sequence of instructions that can be carried out by a supervisor system connected to the hybrid power plant, the supervisor system implementing the method for testing the hybrid power plant according to claim 1.

14. A rotary-wing aircraft comprising at least one lift rotor and one hybrid power plant, the hybrid power plant being configured to rotate the at least one lift rotor, the hybrid power plant comprising:

at least one heat engine configured to rotate the at least one lift rotor; and at least one electric motor supplied with electrical energy by at least one electrical power source, the at least one electric motor being configured to rotate the at least one lift rotor at least when at least one of the heat engine(s) fails, wherein the aircraft comprises a supervisor system connected to the hybrid power plant, the supervisor system implementing the method for testing the hybrid power plant according to claim 1.

* * * * *